Patented Aug. 25, 1942

2,293,939

UNITED STATES PATENT OFFICE 2,293,939

AMELIORATION OF IRON

Frank A. Fahrenwald, Chicago, Ill.; Marjorie P. Fahrenwald executrix of said Frank A. Fahrenwald, deceased No Drawing. Application May 2, 1940, Serial No. 332,955

7 Claims. (Cl. 75—1)

My invention relates to the production of iron particularly in the sponge or powder form and in a relatively high degree of purity by direct reduction with hot reducing gases but without fusion.

The reduction process described in my copending application serial number 332,951, filed May 2, 1940, is suitable alone for producing the very best qualities of sponge iron only when the ore is substantially free from silica, and there are large tonnages of iron ore available which is substantially pure iron oxide except for the presence of a percentage of silica. The commonest sources of supply vary from about 1% silica to about 6%.

Sponge iron produced from such ore without the removal of the silica has been tried for powder metallurgy uses and found unsuitable on account of the silica content.

According to the invention I process the ore or the reduced iron to decompose silica according to the reaction:

$$4HF + SiO_2 \rightleftharpoons SiF_4 + 2H_2O \qquad (1)$$

Such a rabbling furnace as has been described in my copending application Serial Number 326,033, filed March 26, 1940, is suitable for exposing either ore or reduced iron to such a reaction.

The material may be passed through such a rabbling chamber with a basic or metallic lining, while gaseous hydrofluoric acid is passed over it, preferably in countercurrent relationship. As the silicon tetrafluoride is highly volatile, it leaves the chamber in gaseous form and thus the reaction is complete.

The reaction proceeds with fair rapidity at room temperatures and with a substantial evolution of heat, so that the temperature in the chamber may rise to 200° or 300° F. and the reaction is self-supporting.

As is well known in the art, the gaseous silicon tetrafluoride as a vapor is merely bubbled through a water bath at room temperature, or subjected to a water spray. Depending on the volume of water supplied, the following two reactions take place in varying amounts:

$$SiF_4 + 4H_2O \rightleftharpoons Si(OH)_4 + 4HF \qquad (2)$$
$$3SiF_4 + 4H_2O \rightleftharpoons Si(OH)_4 + 2H_2SiF_6 \qquad (3)$$

As much of the fluorine as is regenerated by Equation 2 can be returned at once to Equation 1, and whatever hydrofluosilicic acid is formed can be desiccated to form the products of reaction (4):

$$H_2SiF_6 \text{(solution)} \rightleftharpoons 2HF + SiF_4 \qquad (4)$$

And finally, the $SiF_4$ from Equation 4 can be put back into Equation 2.

The hydrofluoric acid may be generated by reaction with calcium fluoride and any strong mineral acid such as sulphuric or nitric acid.

Alternatively, the hydrofluoric acid may be generated within the ore bed itself, in which case any simple pug mill or mixing device is suitable. When this is done, the ore is first intimately mixed with a calculated charge of fluorspar proportioned in accordance with the amount of silica present and the nitric or sulphuric acid is merely poured into and mixed with the mass. In this way the hydrofluoric acid or fluorine is generated in close proximity to the particles of silica and may be in nascent condition so that it attacks with additional force. When nitric acid is used, the resulting calcium nitrate may conveniently be abstracted from the finished ore by leaching, and the leached ore may be partially or completely dried and then reduced to metal.

Without further elaboration the foregoing will so fully explain my invention that others may, by applying knowledge current at the time of application, readily adapt the same for use under various conditions of service.

I claim:

1. The amelioration of iron ore otherwise of a relatively high degree of purity but contaminated with silica, which comprises: placing the ore in a chamber having non-siliceous walls; decomposing the silica in the ore at temperatures above the volatilization temperature of silicon tetrafluoride, by reaction with hydrofluoric acid; removing the silicon tetrafluoride as a vapor; reacting the silicon tetrafluoride with water; separating the precipitated silicic acid; desiccating and decomposing the resulting hydrofluosilicic acid to regenerate part of the original hydrofluoric acid; and repeating the water reaction to recover additional fractions of hydrofluoric acid, and returning the regenerated hydrofluoric acid to the reaction chamber.

2. The amelioration of iron ore contaminated with silica, which comprises: placing the ore in a chamber having non-siliceous walls; decomposing the silica in the ore at temperatures above the volatilization temperature of silicon tetrafluoride, by reaction with hydrofluoric acid; removing the silicon tetrafluoride as a vapor; reacting the silicon tetrafluoride with water; desiccating and decomposing the resulting hydrofluosilicic acid to regenerate part of the original hydrofluoric acid; and repeating the water reaction to recover additional fractions of hydrofluoric acid, and returning the regenerated hydrofluoric acid to the reaction chamber.

3. The amelioration of iron ore otherwise of a relatively high degree of purity but contaminated with silica, which comprises: mixing the finely divided ore with finely divided fluorspar in calculated amounts sufficient to supply fluorine enough to remove the silica present; subjecting the mixed mass to the action of a strong mineral acid which forms a soluble calcium salt, whereby the silica is decomposed and the silicon passes off as the volatile tetrafluoride; and leaching out the soluble calcium salt to complete the amelioration.

4. The commercial amelioration of iron oxide ore contaminated with silica, which comprises: mixing the finely divided ore with a finely divided decomposible salt of fluorine in calculated amounts sufficient to supply fluorine enough to remove the silica present; and subjecting the mixed mass to the action of a strong mineral acid which forms a soluble calcium salt, whereby the silica is decomposed and the silicon passes off as the volatile tetrafluoride and the soluble calcium salt can be subsequently removed by leaching.

5. The commercial amelioration of iron oxide ore contaminated with silica, which comprises: mixing the finely divided ore with a finely divided decomposible salt of fluorine in calculated amounts sufficient to supply fluorine enough to remove the silica present; and subjecting the mixed mass to the action of a strong mineral acid.

6. The amelioration of iron ore contaminated with silica, which comprises: placing the ore in a chamber having non-siliceous walls; subjecting the ore to reaction with hydrofluoric acid in excess; removing silicon tetrafluoride as a vapor mixed with hydrofluoric acid; separating the acid and the tetrafluoride; and returning the acid to the reaction zone.

7. The amelioration of iron ore contaminated with silica, which comprises: placing the ore in a chamber having non-siliceous walls; decomposing the silica in the ore at temperatures above the volatilization temperature of silicon tetrafluoride, by reaction with hydrofluoric acid; removing the silicon tetrafluoride as a vapor; regenerating hydrofluoric acid from the silicon tetrafluoride; and returning the regenerated acid to the reaction chamber.

FRANK A. FAHRENWALD.